United States Patent
Moreira et al.

[11] Patent Number: 6,051,952
[45] Date of Patent: Apr. 18, 2000

[54] ELECTRIC MOTOR SPEED AND DIRECTION CONTROLLER AND METHOD

[75] Inventors: Julio C. Moreira; Arne M. Nystuen, both of Stevensville; Rosario Ciancimino, St. Joseph; Donald R. Vander Molen, Stevensville; Ronald W. Holling, St. Joseph, all of Mich.

[73] Assignee: Whirlpool Corporation, Benton Harbor, Mich.

[21] Appl. No.: 09/177,928

[22] Filed: Oct. 23, 1998

Related U.S. Application Data

[60] Provisional application No. 60/063,980, Nov. 6, 1997.

[51] Int. Cl.$^7$ .................................................. H02P 1/42
[52] U.S. Cl. .................................... 318/738; 318/748
[58] Field of Search ............................ 318/738, 772, 318/748, 221 E, 774, 218

[56] References Cited

U.S. PATENT DOCUMENTS

| | | | |
|---|---|---|---|
| 4,060,754 | 11/1977 | Kirtley, Jr. et al. | 318/218 |
| 4,099,108 | 7/1978 | Okawa et al. | 318/227 |
| 4,117,364 | 9/1978 | Baker | 318/230 |
| 4,401,933 | 8/1983 | Davy et al. | 318/778 |
| 4,566,289 | 1/1986 | Iizuka et al. | 62/228.4 |
| 4,706,180 | 11/1987 | Wills | 363/312 |
| 4,926,104 | 5/1990 | King et al. | 318/799 |
| 5,252,905 | 10/1993 | Wills et al. | 318/778 |

FOREIGN PATENT DOCUMENTS 59-002591  1/1984  Japan .

OTHER PUBLICATIONS

"Speed control for Asynchronous Motors" by K. Walters, Feb. 1989, London G.B., vol. 15, No. 164, Elektor Electronics.

*Primary Examiner*—Robert E. Nappi
*Assistant Examiner*—Rita Leykin
*Attorney, Agent, or Firm*—Thomas J. Roth; Joel M. Van Winkle; Stephen D. Krefman

[57] ABSTRACT

A motor controller for a single phase induction motor (SPIM), wherein the SPIM is driven by two windings, a line winding connected to the ac line and a control winding driven by the controller. The SPIM torque and hence the speed and direction is controlled by the voltage output of the controller for all speeds below the synchronous speed (set by ac line frequency). The controller adjusts the amplitude, the phase angle relative to the line winding, and the frequency of the voltage for the desired SPIM responses. The controller can also selectively switch power to the line winding for a different operating mode with both windings at below synchronous speed. Or, the controller can open the connection to the line winding after starting, and operate the SPIM via the control winding at any speed by adjusting the amplitude and frequency of the controller voltage.

26 Claims, 11 Drawing Sheets

ELECTRIC MOTOR SPEED AND DIRECTION CONTROLLER AND METHOD

This application claims the benefit of U.S. Provisional Application No. Ser. No. 60/063,980 filed Nov. 6, 1997.

BACKGROUND OF THE INVENTION

1. Field of the Invention

The present invention generally is directed to means and methods for controlling electric motors. More specifically, the invention is directed to means and methods for controlling the torque developed by single phase induction motors thereby controlling their speed and/or direction.

2. Background of the Related Art

Single phase induction motors (SPMs) constitute the majority of motors used in home appliances today. SPIMs include permanent split capacitor (PSC) motors, split phase motors, capacitor start motors, capacitor run motors, permanent magnet synchronous motors, and shaded pole motors. As is known, these motors are inherently single speed motors and are used in various machines like clothes washers, clothes dryers, dishwashers, hermetic compressors, fans, pumps, draft inducers, et cetera It is also known that single phase induction motors inherently produce torque after they are running but they produce no starting torque.

There are several well known techniques for providing the necessary starting torque. For example, some prior art motors supply the first winding directly from the ac utility line and supply the second winding from the ac line through a reactive element, such as a capacitor, to generate the necessary voltage time displacement, known as a phase shift. Other prior art motors switch the reactive element out of the circuit as is done in a capacitor start motor, or left in the circuit to improve running performance as in a permanent split capacitor (PSC) motor.

SPIMs, generally are supplied power from an ac utility line at 50 or 60 Hz and at 120 or 230 volts. These motors typically have an output power rating of between 5 to about 1500 watts.

As mentioned above, these motors operate at constant speed when supplied from the ac utility line. When multiple speeds are needed, techniques like multiple windings with different number of poles, or tapped windings are used. In some applications, like fans, blowers, or pumps, the applied voltage to the motor is reduced in order to decrease the motor speed.

In applications where direction changing is required for a motor, a SPIM with only one winding energized full time is generally stopped or slowed to a speed where a start switch (e.g. centrifugal switch) energizes a start winding again, and then the motor is started in the other direction. Startng in the other direction requires a second start winding that is wound 180 electrical degrees out of phase with the first start winding or a switching system that reverses the polarity (connections) of the first start winding such that the flux produced by the second start winding will be 180 degrees out of phase with the flux produced by the first start winding. These motors can also be reversed under power by switching in the second winding before stopping or slowing the rotor; however, this is generally not done because of the higher reversing current (load point at reversal gives a very poor torque per ampere ratio).

A SPIM with both windings energized full time, such as a permanent split capacitor motor, is reversed by using a switching system that reverses the polarity (connectors) of one of the windings or changes the connection of the capacitor from being in series with one of the windings to being in series with the other winding. Reversals under power are more common with this type of motor as they are generally designed with a better torque per ampere ratio at reversal.

In industrial applications, three phase induction motors have been used instead of SPIMs due to the general availability of three phase power, as well as the higher output capabilities, higher torque production, higher efficiency and lower inrush currents of the three phase motors. Multiple speeds, torque and a means to reverse are typically provided in the motor's controller. However, in residential appliances, SPIMs are preferred due to the greater availability of single phase power.

Furthermore, the variable speed three phase motors, notably induction motors driven by hard switching three phase inverters as commonly used in industrial applications are not suitable for the home appliances because home appliance motor designs are driven by low cost, high efficiency, small size, and high production volume, which are not the main driving forces behind industrial motor controller designs.

The following patents disclose various means and methods for driving polyphase motors and/or SPIMs. A polyphase motor is designed to have at least two windings, where each winding is connected across a different set of ac voltage supply terminals. The ac voltages supplied for starting and running the polyphase motor are of the same frequency but differ in phase (more than one phase). A SPIM being different than a polyphase in that the SPIM is designed to have one or more windings that connect either directly on indirectly across a single set of ac voltage supply terminals for both starting and running.

U.S. Pat. No. 4,060,754 discloses an electronic motor that operates from a single phase power supply and has operating characteristics of a polyphase motor. One of the motor's windings is connected directly to a source of single phase power, the second winding is connected to an electronic waveform synthesizer that produces a stepped sinusoidal waveform that is shifted in phase appropriate to start and run the polyphase motor.

U.S. Pat. No. 4,401,933 discloses a SPIM control system that uses power line assisted starting and runs at higher Oman power line frequency from an electronically generated inverter supply. The motor's start winding is connected to a source of single phase power, the second winding is connected to an inverter that provides a phase shifted voltage. The motor stats and comes up to a minimum speed (around 50 percent of final operating speed), the start winding is then disconnected and the motor continues to accelerate to the final operating speed under the action of the run winding and the inverter. The final speed is set by the output frequency of the inverter This patent also discloses a sense winding to sense the current in the start winding, and a braking circuit to stop the motor.

U.S. Pat. No. 4,117,364 discloses a variable frequency voltage waveform synthesizer driving a rotating electric machine similar to the above mentioned patents. The synthesizer provides a stepped waveform output with the widths of the steps being controllable as to affect power transfer of the waveform as well as the harmonic content therein.

Thus far, control systems for SPIMs that convert fixed frequency AC power to DC power and then invert the DC power to a voltage, of variable amplitude, frequency, and phase angle, to control the speed of a single phase induction motor do not optimize the control for the torque per ampere ratio of the motor over the full range of operating conditions. Very often the control will be optimized with a focus on one operating point or condition.

Generally this is a specific speed and torque, a stating condition, or loads driven at speeds above synchronous speed.

SUMMARY OF THE INVENTION

The present invention provides new means and methods for controlling the speed and/or direction of a single phase induction motor. The invention provides means and methods for operating a SPIM at synchronous, lower than synchronous and higher than synchronous frequencies. In doing so, the invention also provides a simple and reduced part count motor controller for appliances.

In particular, it has been discovered that SPIMs can be effectively driven by a square wave signal and that SPIM are tolerant of the extra harmonics inherently provided by square wave signals. Depending on desired operating characteristics, the square wave may be shaped by suppressing or eliminating one or more harmonic components. Further, the motor topology may include a selective application using the SPIM's two windings or an application using one winding as a split phase motor. Yet further, the overall system may include any combination of the foregoing.

DETAILED DESCRIPTION OF THE PREFERRED EMBODIMENTS

The invention is a single phase induction motor (SPIM) and a motor control, referred to generally as a SPIM Drive system or a motor drive system. Specifically, the invention focuses on the operation and configuration of a controller for a SPIM as well as the controller's interconnection with the SPIM. The invention, permits a normally single-speed or multi speed SPIMs to be operated as a variable speed motor at its synchronous speed or below, including reversing. The invention also permits a normally single-speed SPIM to be operated as a multi-speed motor at any speed without the need for special motor configurations, including extra poles.

In the description, the term "low speed" refers to operation at synchronous speed and below, and the term "high speed" refers to operation above synchronous speed. Synchronous speed is determined by the standard text book formula using the rated frequency and the number of magnetic poles of the SPIM winding that is being controlled.

Figure 1:
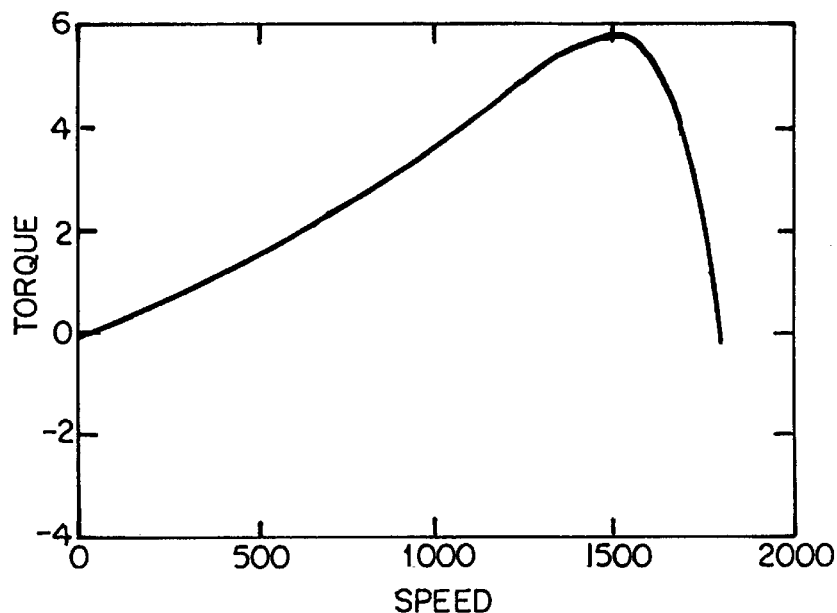
FIG. 1 illustrates a torque versus speed characteristic curve for a SPIM running single phase, i.e. without a starting or running capacitor.

It is known that a SPIM operating on one winding at a constant excitation frequency produces an average steady state torque that is a function of the motor slip and a function of the rotor speed as illustrated in FIG. 1. The torque versus speed curve 10 shows that the SPIM does not have any starting torque. To generate the necessary starting torque, it is common to use a second winding placed in the stator at 90 electrical degrees from the first winding. Additionally, the voltage supplied to this second winding needs to be time displaced with respect to the voltage applied to the first winding. Prior art motors usually supply the first winding directly from the ac utility line and the second winding is also supplied from the ac utility through a reactive element, such as a capacitor, to generate the necessary voltage time displacement, known as a phase shift. Prior art motors can switch the reactive element out of the circuit as is done in a capacitor start motor, or left in the circuit to improve running performance as in a permanent split capacitor (PSC) motor. The SPIM can be best utilized for a given load when the SPIM is operated within its temperature limits and the torque is optimized. The SPIM torque is optimized when the SPIM is developing the maximum torque per ampere of input current to the motor. Torque optimization minimizes the current needed and reduces the negative effects caused by a relatively large current draw (light flickering, mechanical noise, EMC, etc.). As an example, for maximum torque per ampere production, the voltage phase shift introduced by the capacitor in a PSC motor is 90 degrees (in time). However, this phase shift is a function of the motor internal impedance which changes with motor operating conditions. Hence, the ideal phase shift of 90 degrees for prior art motors is generally achieved for a single operating point which is usually one of the points within the motor's output rating. Only at this point is the torque optimized. At any other operating point the motor torque per ampere decreases and the motor exhibits low torque per ampere ratio and low starting torque, which is a key disadvantage for reversing applications. A low torque per ampere ratio means that as the motor operating point moves away from the optimum, more current is necessary to generate the same amount of torque. As more current is drawn, the negative effects of light flickering, mechanical noise, electromagnetic radiation and conduction, etc. are produced.

First Embodiment

Figure 2:
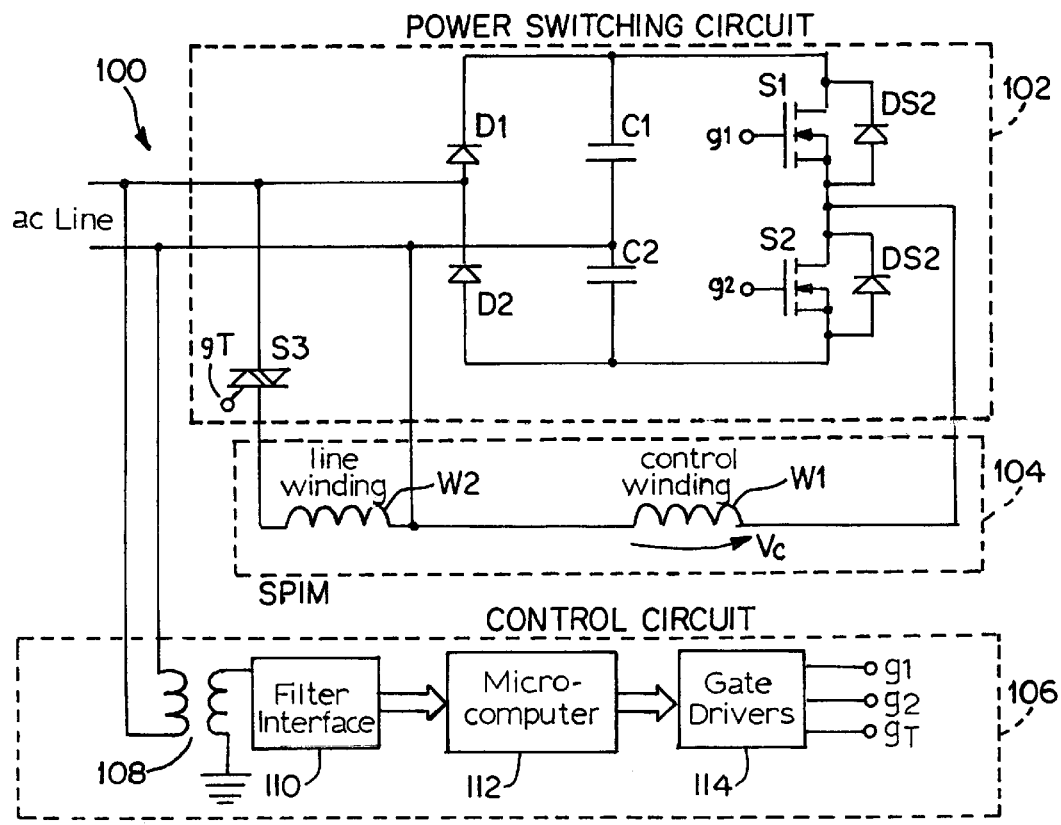
FIG. 2 illustrates a first embodiment of a SPIM controller circuit for controlling a SPIM according to invention.

FIG. 2 illustrates a first embodiment of a SPIM controller system 100 according to the invention, which overcomes the disadvantages of the prior art motors and offers many other advantages. The SPIM controller system 100 comprises a power switching circuit 102, a SPIM 104 and a control circuit 106, which function together to apply a predetermined voltage waveform to the SPIM 104 to control the various parameters of the SPIM 104, such as torque and speed. For example, the phase angle, waveform shape, and voltage amplitude of the applied waveform can be controlled by the SPIM control 100 to affect the torque and speed of the SPIM 104.

The SPIM 104 comprises a control winding W1 and a line winding W2. The power switching circuit 102 is directly connected to the ac line and is connected to and supplies a control winding voltage Vc to the control winding W1 of the SPIM 104. The power switching circuit 102 is connected to and controlled by a control circuit 106. The line winding W2 is directly connected to the ac line through a switch S3, which is only needed for some modes of operation.

The power switching circuit 102 operates as an interface between the low voltage operation of control circuit 106 and the high voltage operation of the SPIM 104. An input stage of the power switching circuit 102 comprises diodes D1 and D2 and capacitors C1 and C2. The input stage receives power directly from the ac line and doubles the voltage available to an output stage that comprises power transistors S1 and S2 and diodes DS1 and DS2. The voltage doubling enables the power switching circuit 102 to supply the SPIM 104 with a voltage up to the amplitude of the ac line supply voltage. For most applications, a SPIM rated for 120 Vac or 230 Vac can then be used with the SPIM controller 100. The power transistors S1 and S2 are turned on and off by the low voltage control circuit 106 to provide a predetermined waveform to control the operation of winding W1. The diodes DS1 and DS2 provide a path for inductive currents to flow when motor magnetic fields collapse as the power transistors S1 and S2 are switched off.

The control circuit 106 comprises a transformer 108, a filter interface 110, a microcomputer 112, and power transistors gate drivers 114. The transformer 108 is connected to the ac line and steps the ac line voltage down to an acceptable level to supply a standard type low voltage signal for the control circuit 106. It also provides electrical isolation from the ac line. The filter interface 110 is connected to the transformer 108 and prevents the ac line's conducted electrical noise and other electrical noises from affecting the operation of the SPIM controller 100. The microcomputer 112 is connected to the filter interface 110 to detect an ac line voltage zero crossing from the secondary voltage of transformer 108 and outputs a predetermined waveform switching pattern to the power transistors gate drivers 114 to generate a control waveform for controlling the operation of the control winding W1. The control waveform can be any desired form but is preferably a square wave or a modified square wave. The microcomputer 112 uses harmonic suppression or pulse width modulation (PWM) to generate the switching signals needed to generate the modified square wave.

The gate drivers 114 operate as an interface between the low voltage microcomputer 112 and the gates g1 and g2 of the power transistors S1 and S2 and gate gT the of switch S3 by supplying the proper gating waveform switching pattern and doing the necessary voltage level shifting for the power transistors S1 and S2, and switch S3. Three outputs of gate drivers 114 (respectively labeled in the control circuit 106) are used, one for each gate of the power transistors S1, S2 and switch S3. The microcomputer 112 executes software stored in a memory of the microcomputer and generates an output pattern with the desired frequency, phase angle, and voltage, by selecting, via a pointer, a proper look up table and location stored in the memory of microcomputer 112. The output pattern is supplied to the gate drivers 114 and the switch S3.

To generate the desired output, two internal hardware features of microcomputer 112 are used, a timer and a zero crossing detector circuit. Both internal hardware features are standard in many microcomputers today and are readily utilized by one skilled in the art The internal timer generates a system interrupt request at the end of a period of time preselected by the microcomputer program, the internal timer interrupt request is also cleared by the microcomputer program. The internal timer is driven from the microcomputers system clock. In the preferred embodiment, the internal timer generates a system interrupt request every 150 microseconds; however, the time period preselected by the program could be different depending on the desired degree of control. Adequate control is achieved in this particular case with one cycle of a 60 Hz output waveform being divided into approximately 111 equal output periods of 150 microseconds each.

The zero crossing detector circuit is used to determine the specific point in time that the supply voltage of the ac line goes through a zero voltage level as well as the voltage polarity change taking place. The zero crossing detector circuit connects to external circuitry via a hardware input of microcomputer 112. The zero crossing detector generates a system interrupt request at each zero crossing with a selected voltage polarity change. The microcomputer program preselects whether the interrupt request is generated at a zero crossing voltage change of positive to negative or negative to positive or for both. The microcomputer program also clears the zero crossing interrupt request. In the preferred embodiment the zero crossing detector generates a system interrupt for every positive to negative zero crossing of the ac line voltage, which generates a system interrupt for each complete cycle of the ac line voltage.

There are many known circuits to connect the hardware input of microcomputer 112 to the ac line. In the preferred embodiment, the input of microcomputer 112 connects to a pulled up collector of a transistor that is in saturation or cutoff. The clamped transistor base is driven by a resistor divider network connected to the secondary of transformer 108 that is driven by the ac line.

Figure 3:
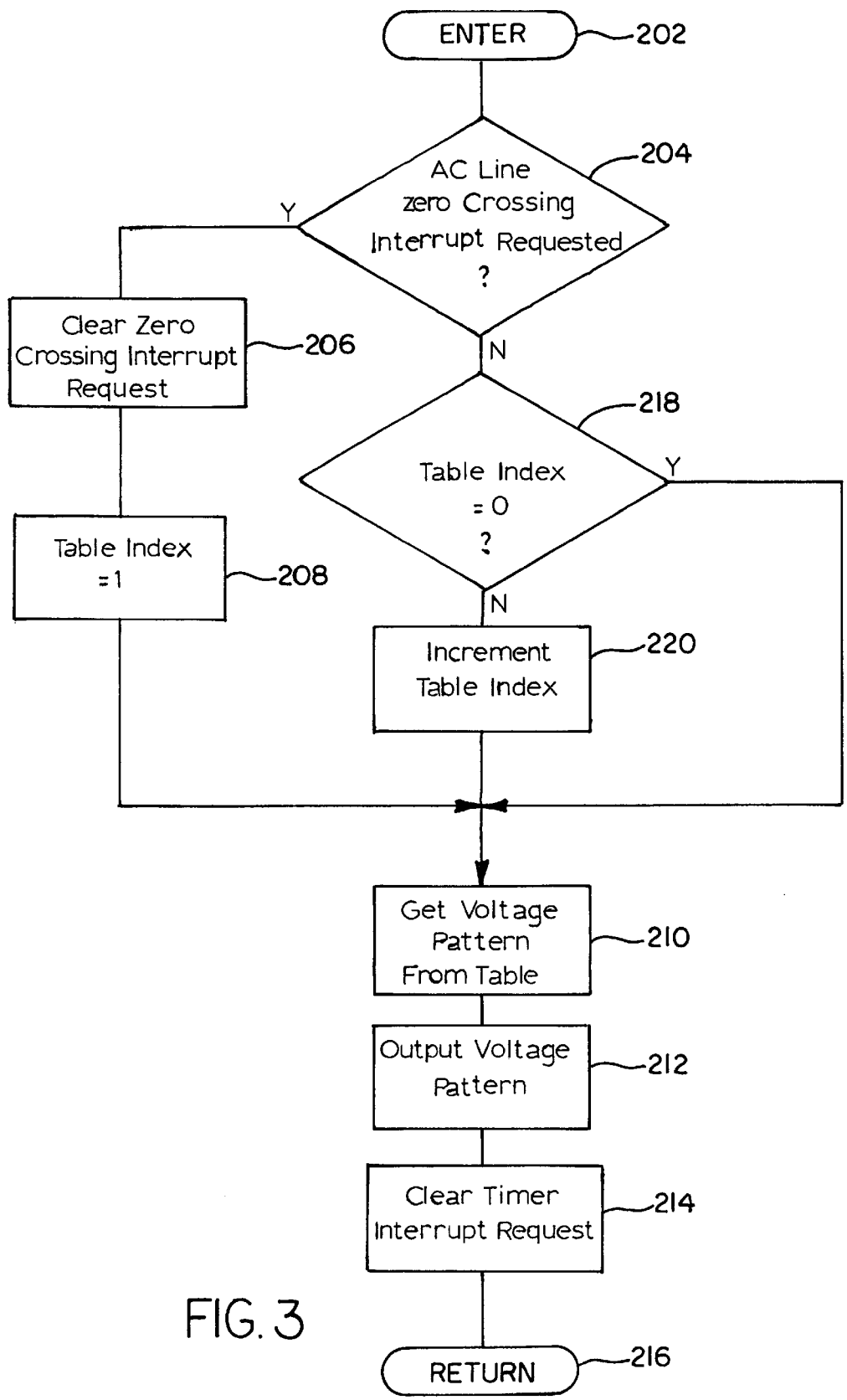
FIG. 3 illustrates a flow chart of software for controlling the outputs of the microcomputer for the SPIM controller circuit of FIG. 2 and hence the power switching drives of the SPIM controller according to the invention.

FIG. 3 illustrates a flow diagram of a subroutine 200 executed by the microcomputer 112 to output the desired voltage pattern. The remaining operation of the motor is controlled in a manner well known in the art. Each time the internal timer of microcomputer 112 causes a system interrupt request, the program of microcomputer 112 enters subroutine 200 at control block 202.

Control proceeds to decision block 204 to determine if the zero crossing detector circuit has requested the ac line zero crossing interrupt If the ac line zero crossing interrupt has been requested, block 206 clears the zero crossing interrupt request, then block 208 sets a memory pointer Table Index to one (the memory pointer Table Index is initialized to zero on power up of microcomputer 112), which causes the memory pointer to point to memory location one of a particular (program chosen) table in memory. The one location in the table is used each time the zero crossing detector circuit requests a zero crossing interrupt, which synchronizes the memory pointer Table Index with a selected zero crossing of the ac line.

Control then passes to block 210 which gets the voltage pattern from the memory location pointed to by Table Index, then block 212 places the voltage pattern on the outputs of microcomputer 112. The outputs of microcomputer 112 are latches that drive the gate drivers 114. Control then passes to block 214, which clears the internal timer system interrupt request. Control then passes to block 216, which returns the operation of microcomputer 112 to the main program.

If at decision block 204, it is determined that the zero crossing interrupt has not been requested, control goes to decision block 218 to determine if the memory pointer Table Index is zero. If it is determined that Table Index is zero, then microcomputer 112 is in the period after power up and before the occurrence of a first proper zero crossing. The control then passes to block 210 with Table Index pointing to the zero location of the memory table. In the preferred embodiment the voltage output pattern determined by the zero memory location gives an output voltage of zero to the control winding W1 of SPIM 104. From block 210, control passes to block 212 and onward as previously explained. If at decision block 218 it is determined that Table Index is not zero, then microcomputer 112 is in one of the output periods other than the first or before the first, and control passes to block 220 which increments the pointer, pointing the Table Index to the next memory location in the table. Control then passes to block 210 and onward to block 212 as previously explained. Using the subroutine 200, the microcomputer 112 generates a voltage output pattern with the desired amplitude, frequency, and phase angle in any combination, by selecting the proper look up table stored in the memory of microcomputer 112. The output from microcomputer 112 drives gate drivers 114 that in turn drive power transistors S1, S2 and switch S3. Power transistors S1 and S2 supply the voltage output pattern, of the desired amplitude, frequency, and phase angle, in any combination to the control winding W1, and switch S3 opens or closes the connection between the ac line and line winding W2 of the SPIM 104.

Modes of Operation

A SPIM controlled as described above by the SPIM controller system 100 according to the invention can be operated in several different modes. The most important modes are described below.

It should be noted that the torque of the SPIM 104 is a function of the phase angle between the voltage Vc applied to the control winding W1 and the voltage $V_L$ applied to the line winding W2, the shape of the waveform for Vc, and the amplitude of the voltage Vc (which is a function of the fundamental component of the waveform). The importance of the different torque variables will vary with the different modes of operation.

Optimizing Mode

The most important mode of operation for the SPIM controller system 100 is the optimizing of the torque/ampere ratio throughout the entire range of operation of the SPIM 104. For the Optimizing Torque/Ampere Mode, the switch S3 is not required in the direct connection of the line winding W2 to the ac supply. To optimize the torque per ampere ratio for a motor with symmetric windings (both the control winding W1 and the line winding W2 have the same effective number of turns and are displaced by 90 electrical degrees), the SPIM controller system 100 maintains a 90 degree phase shift between the control winding voltage Vc and the line voltage VL throughout the entire operating range of the SPIM 104 by controlling the waveform switching pattern applied to the power switching circuit 102 in response to the odd zero line crossings read by the microcomputer 112.

It should be noted that the term optimizing refers to the maintaining of the 90 degree phase shift and does not necessarily mean that the absolute magnitude of the torque developed by the motor will be a maximum; even though it is true that the 90 degree phase shift yields the maximum amount of torque for a given amplitude of the control voltage Vc. This is because the magnitude of the torque is also a function of the amplitude of the control voltage Vc and the shape of the applied waveform. Advantageously, the SPIM controller 100 can control one or both of the voltage amplitude and the waveform shape in addition to the phase shift to obtain a greater torque or a maximum torque than otherwise obtainable with the optimizing alone.

Figure 5:
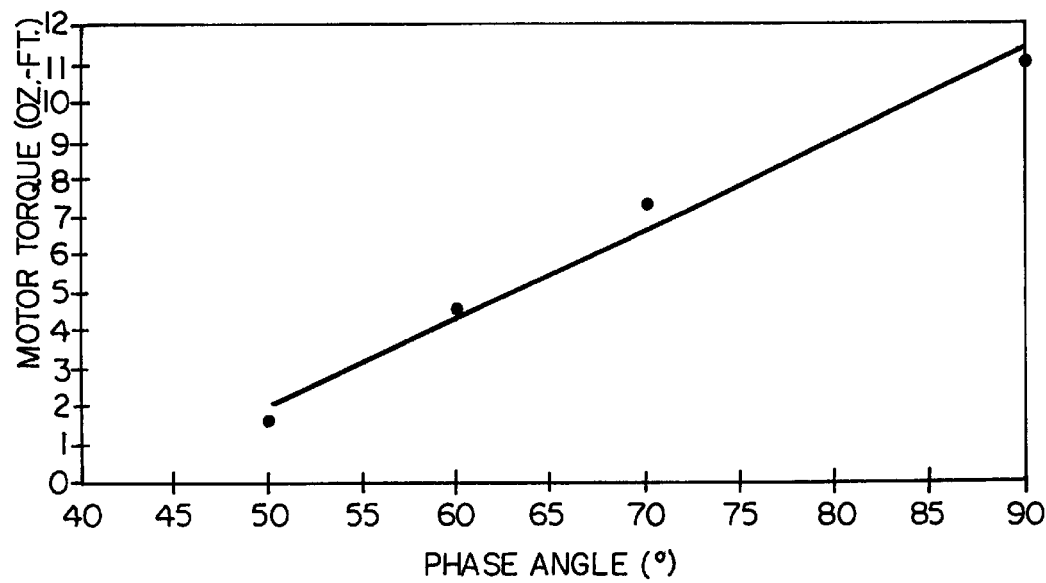
FIG. 5 illustrates motor torque versus the difference in phase angle between the ac line voltage and output voltage of a SPIM controller operated according to the invention.

In greater detail, the SPIM torque is a function of the phase angle (in time) difference between the fundamental voltage component of the voltage supplied by the SPIM controller 100 to the control winding W1 and the ac line voltage. The SPIM controller 100 is used to vary the phase angle difference of the fundamental voltage component of the control winding voltage Vc relative to the ac line voltage; hence, control the SPIM torque. The torque, acceleration, and torque per ampere ratio are controlled by varying this phase angle difference. The torque per ampere ratio is optimized only when the phase angle difference between the voltages supplied to the control winding W1 and the line winding W2 is 90 electrical degrees. FIG. 5 shows experimental results using the phase angle difference control method. Measured SPIM torque, for a fixed slip (0.33) at 60 Hz, is plotted as a function of the difference between the phase angle of the SPIM controller 100 voltage applied to the control winding W1 and the ac line voltage applied to the line winding W2. The SPIM torque is also a function of the fundamental component amplitude of the voltage supplied by the power switching circuit 102 to the control winding W1. The line winding W2 has the direct connection to the ac line voltage, which is generally, a fixed voltage. The SPIM controller 100 is used to vary the fundamental component of the voltage applied to the control winding W1 and; hence, control the absolute magnitude of the torque produced by the SPIM 104.

Figure 4:
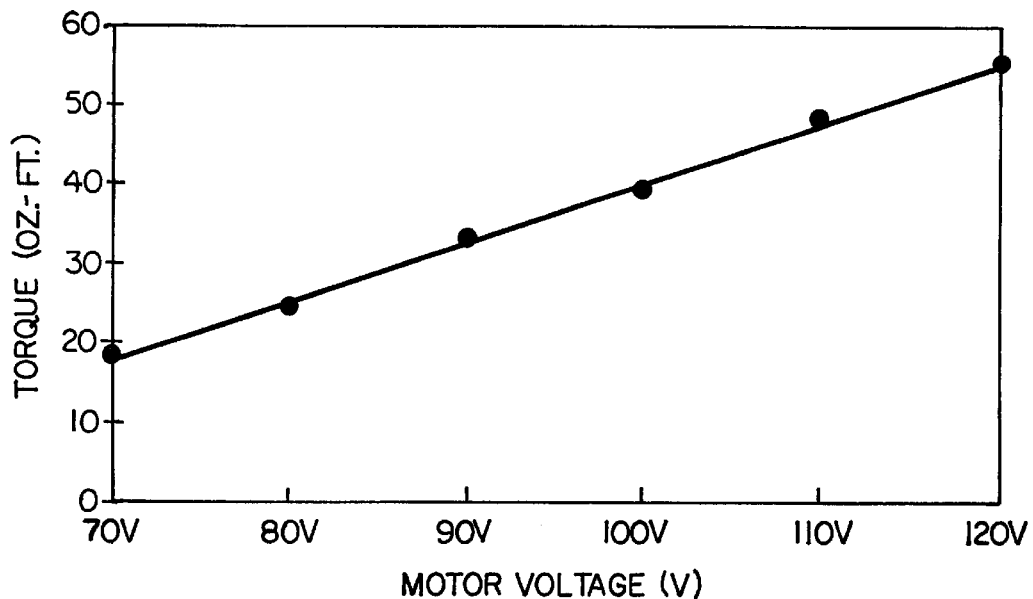
FIG. 4 illustrates motor torque versus an output voltage of a SPIM controller operated according to the invention.
Figure 6:
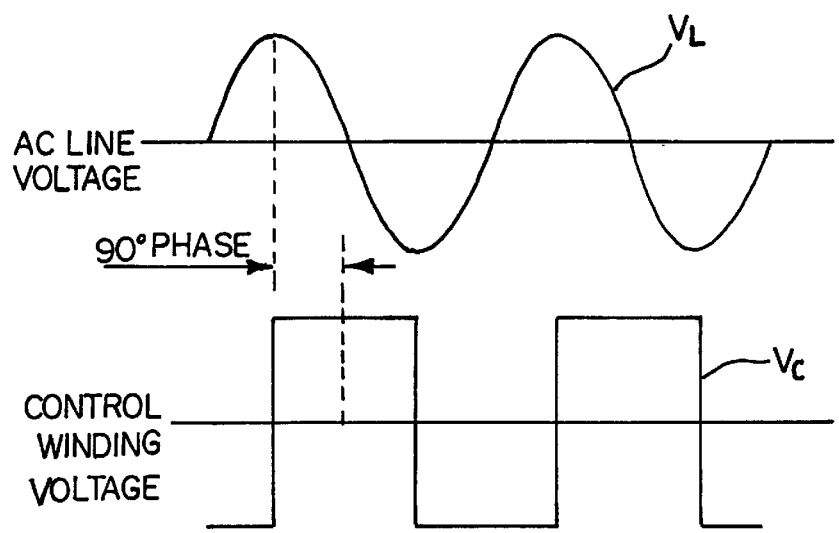
FIG. 6 illustrates the phase shift of the output voltage of the SPIM controller relative to ac line for optimizing SPIM performance.

The starting torque, and thus SPIM acceleration is controlled by controlling the fundamental component amplitude of the control winding voltage Vc by means of pulse width modulation (PWM) techniques, or via harmonic suppression methods. FIG. 4 shows experimental results using the fundamental component amplitude control method applied to the control winding voltage Vc. Measured SPIM torque, for a fixed slip (0.33) at 60 H, is plotted as a function of the SPIM controller 100 voltage applied to the control winding W1. The voltage waveforms applied to both motor windings are shown in FIG. 6. The control winding voltage Vc of the SPIM controller 100 applied to the control winding W1 is always phase shifted 90 degrees with respect to the ac line voltage VL when optimizing the motor performance at or below synchronous speeds for all operating conditions using both windings.

Figure 7:
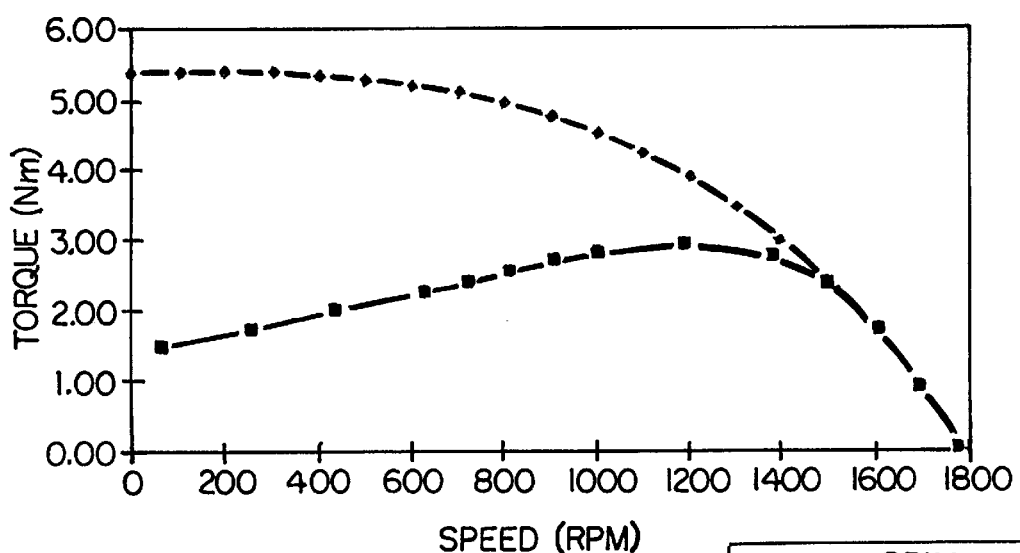
FIG. 7 illustrates the comparison of motor torque versus speed for a SPIM operating as a PSC motor and the same SPIM operated by the SPIM controller according to the invention
Figure 8:
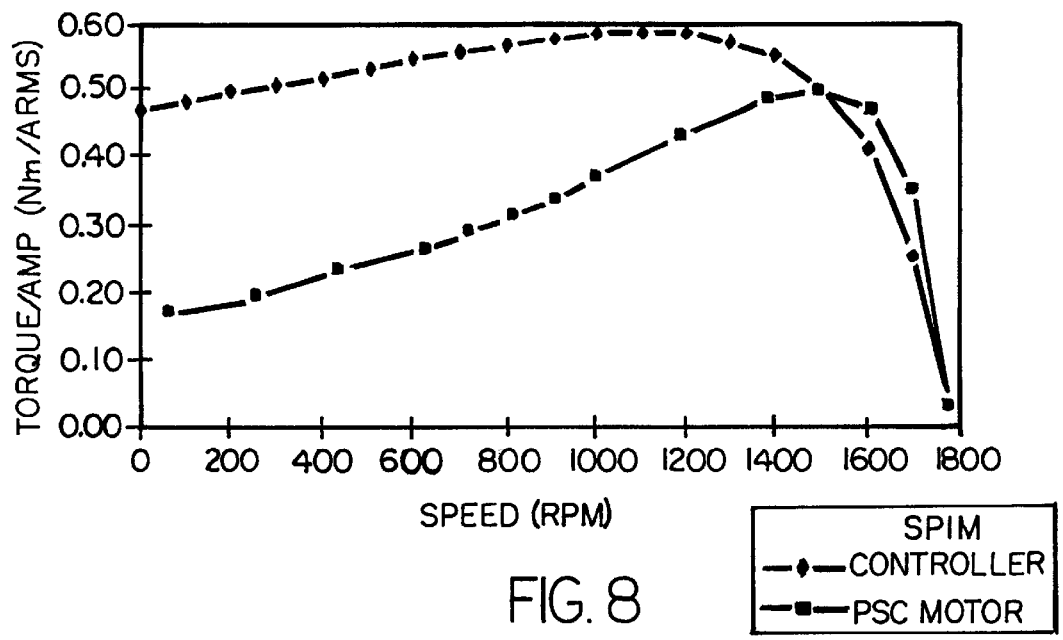
FIG. 8 illustrates a comparison of motor torque per ampere versus speed for a SPIM operating as a PSC motor and the same SPIM operated by a SPIM controller according to the invention.

In FIG. 5 the control winding voltage Vc is an unmodulated square wave, which is preferred because it develops the greatest torque for a given phase angle and voltage amplitude. Maximum motor starting torque is achieved when the control winding W1 is supplied with a control winding voltage Vc of an unmodulated square wave from the SPIM controller 100 that is displaced or phase shifted in time 90 electrical degrees from the ac line voltage, when the line winding is supplied directly from the ac line. Simulation and experimental results show that the SPIM 104 starting torque can be increased by a factor greater than 3, and the torque per amp ratio by a factor greater than 2.5 with this arrangement of the invention as compared to the values obtained from the same motor operating as a PSC motor. Other waveforms for the control voltage Vc can be used depending on the desired result. For example, in some applications, the use of an unmodulated square wave may cause too much motor noise or heat and a different waveform would be used, such as a shaped square wave or a sinusoidal waveform using techniques such as the PWM or harmonic elimination as described above. The waveform would be selected by the microcomputer, which would select or be programmed with the desired waveform switching pattern FIG. 7 and FIG. 8 show comparison data for motor torque, and torque per ampere ratio as a function of speed for a SPIM running as a PSC Motor supplied from the ac line, and with the same motor running with the SPIM controller 100. As can be seen in FIG. 7, the SPIM controlled according to the invention generates a much greater starting torque and overall operating torque as compared to the PSC motor. Most importantly, FIG. 8 illustrates that the SPIM controlled according to the invention maintains a much greater torque/ampere ratio than the PSC motor.

In addition to optimized performance, the SPIM controller 100 eliminates the need for a motor starting or running capacitor. Additionally, the invention provides improved electromagnetic compatibility (EMC) over a SPIM electronic controller where both motor windings are supplied by the controller. With the invention, the current from the ac line is composed of two components; a sinusoidal one that supplies the line winding W2, and a series of current pulses caused by the charging of capacitors C1 and C2 of the controller FIG. 2. The sinusoidal current component supplied directly to the line winding W2 helps improve the ac line current form factor and total ac line power factor, hence, the EMC improvement.

Phase Angle Reversing Mode

The SPIM controller 100 also controls a reversal of the direction of the SPIM's output rotation. To reverse direction of the SPIM 104, the phase angle of the control voltage Vc is changed relative to the line winding voltage VL. To obtain the maximum rate of reversal, the voltage phase shift of the controller's control winding voltage Vc, relative to the ac line, is changed from +90 degrees to −90 degrees or vice versa. The reversal is initiated by the microcomputer 112 sending the appropriate waveform switching pattern to the power switching circuit 102 in response to the control software in the microcomputer 112.

Figure 9:
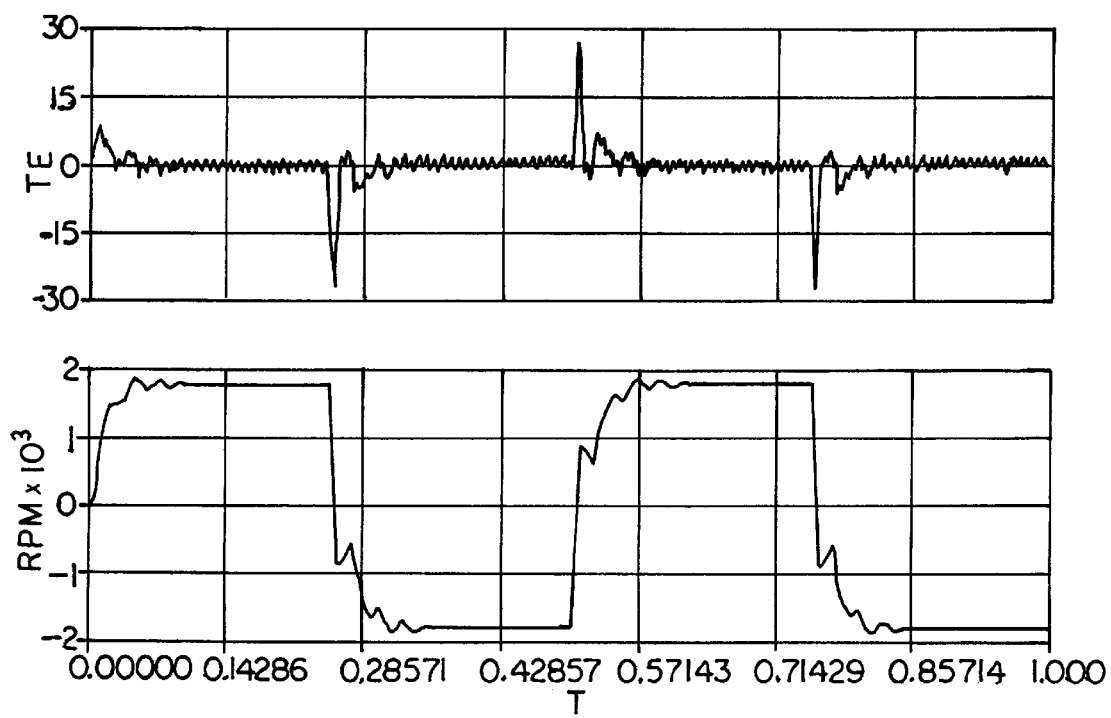
FIG. 9 illustrates the torque versus time and the speed versus time of a SPIM reversing direction with a change of the difference in phase angle between ac line and output voltage of the SPIM controller from +90 degrees to −90 degrees.

Under these controller conditions the SPIM 104 reverses almost instantaneously. The rapid reversal comes about because of the use of a 90 degree phase angle difference that optimizes torque per ampere. The torque of the SPIM 104 is also maximized per a given ac line voltage when in addition to optimizing the torque per ampere, the control winding voltage Vc supplied by SPIM controller 100 is an unmodified square wave. FIG. 9 shows SPIM 104 reversing results, the motor torque TE in Nm and motor speed in rpm are respectively displayed in the upper and bottom traces versus time in seconds.

In some cases where the mechanical integrity of the load and/or transmission system can be compromised by high values of motor torque produced during reversals, a quick reversal is not desired. A controlled and slower SPIM 104 reversal can be achieved by gradually changing the controllers output fundamental voltage component phase angle difference from +90 degrees to −90 degrees. Microcomputer 112 generates the desired output pattern of the power switching 102 circuit by selecting the proper look up table stored in the memory of microcomputer 112. The rate of change of the phase angle will define how fist the SPIM 104 reverses.

Figure 10A:
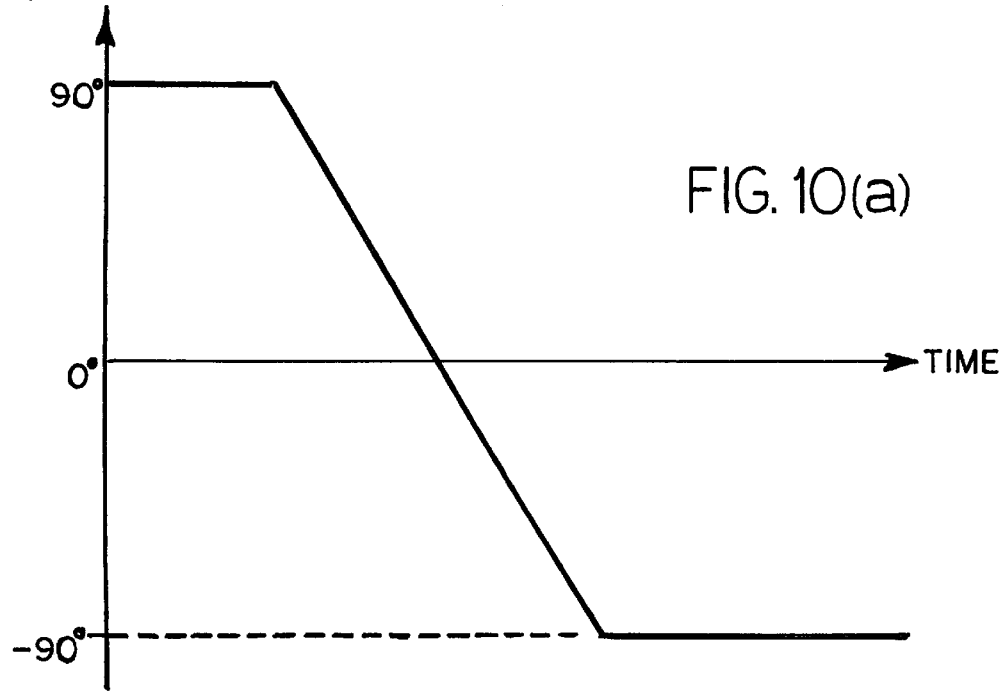
FIG. 10(a) illustrates how the phase angle difference is changed to control a gradual SPIM reversal according to the invention.
Figure 10B:
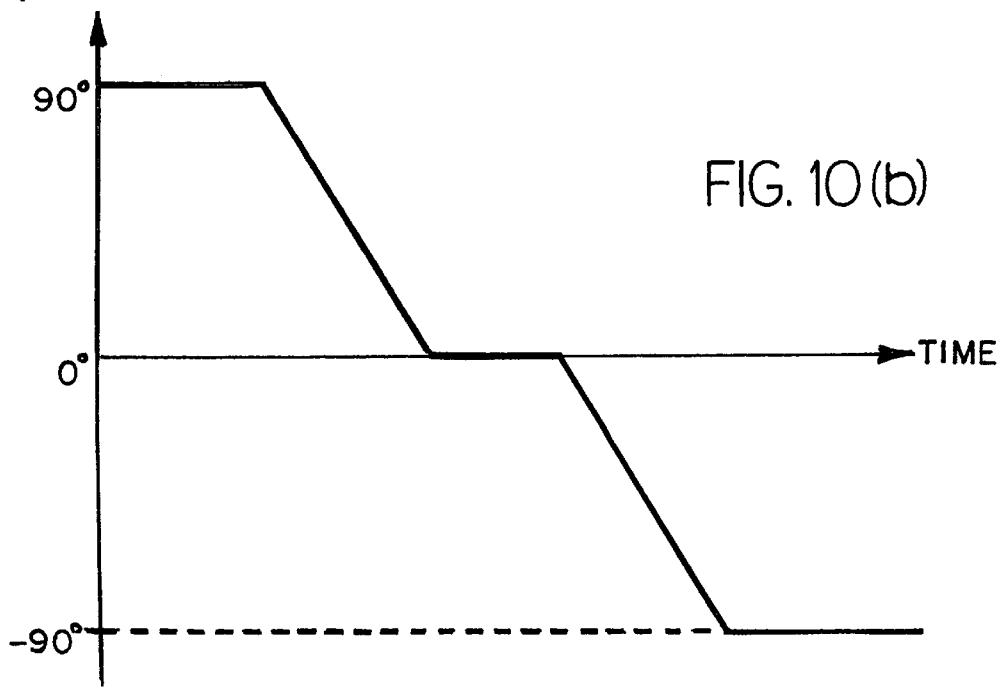
FIG. 10(b) illustrates the gradual SPIM reversal of FIG. 10(a) but with a dead time where the phase angle difference is kept at zero.

FIGS. 10(a) and 10(b) show how the phase angle difference between the voltage of the control winding W1 and the voltage of the line winding W2 is varied by the SPIM controller 100 to control the SPIM reversal. A gradual phase angle difference change from +90 degrees to −90 degrees is shown in FIG. 10. FIG. 10b shows a gradual reversal including a dead time where the phase angle difference is kept at zero. Although FIGS. 10(a) and 10(b) disclose two ways in which the rate of reversal can occur, it is within the scope of the invention for the reversal to occur at any desired rate. To obtain a desired reversal rate, the appropriate waveform switching patterns need only be stored in the microcomputer 112. Besides controlling the phase angle to achieve a desired reversal rate, one could also vary the voltage applied to the control winding W1. That voltage can be reduced during the reversal in order to reduce the reversing torque generated.

Split Phase—High Torque/Low Speed Reversal Mode

A second way to control the torque and reverse the direction of rotation with less loss and improved SPIM 104 performance is to operate in different modes at specific portions of the reversal cycle. The modes of operation are three that are discussed in other areas of the specification.

Herein is described, a SPIM 104 reversal in terms of speed and direction and the particular control mode applied.

We start with the SPIM 104 rotating at an increasing or constant speed in the forward direction in the Optimizing Mode where the line winding W2 is supplied by ac line voltage and the control winding W1 is supplied by the control winding voltage Vc. In the optimizing mode the control winding voltage Vc is out of phase with the ac line voltage by approximately 90 degrees and we have maximum torque per ampere. We start the braking process and slowing SPIM 104 by changing to the Split Phase Mode where the ac line voltage is no longer supplied to line winding W2, and we start lowering the frequency of the control winding voltage Vc. SPIM 104 is now being driven more and more slowly in the forward direction. Because we are in the Split Phase Mode being driven by a lower frequency voltage, the slip is reduced as opposed to slowing the SPIM 104 down by using the Optimizing Mode and reducing the amplitude of the control winding voltage Vc. The reduced slip, cuts losses and lowers internal heating, which improves SPIM 104 performance.

As the SPIM 104 approaches a zero speed in the forward direction, the operation is changed to the High Torque/Low Speed Mode, which controls the torque to drive the SPIM 104 in the reverse direction. The torque for the reversal comes from the properly phased approximately 90 degree phase shift between a synthesized lower frequency voltage ($\frac{1}{3}$ ac line frequency) applied to the line winding W2 and the control winding voltage Vc applied to the control winding W1 at the same lower frequency. The SPIM 104 is accelerated in the reverse direction toward the lower synchronous speed which is $\frac{1}{3}$ the normal synchronous speed.

As the SPIM 104 approaches the lower synchronous speed in the reverse direction, the operation is changed to the Optimizing Mode, which continues accelerating the SPIM 104 in the reverse direction up to the speed desired. At this point the SPIM 104 has completed one reversal in the Split Phase—High Torque/Low Speed Mode.

Frequency Reversal Mode

Another way to control the torque and the direction of rotation of the SPIM 104 is to control the frequency of the SPIM controller's control winding voltage Vc supplied to the control winding W1 so that it is slightly different relative to the frequency of the line winding W2. The electromagnetic torque of SPIM 104 is a function of the magnetomotive force (mmf) supplied by the line winding W2 and the control winding W1. The mmf is a direct function of the respective winding's distribution and currents of line winding W2 and control winding W1. The current in these windings is caused respectively by the ac line voltage and the control winding voltage Vc.

Assume the line winding W2 and the control winding W1 make symmetric contributions to the mmf function and are displaced in space by 90 electrical degrees. Assume also that the ac line voltage and the control winding voltage Vc are of the same frequency and their respective currents are symmetric and are displaced in time by 90 electrical degrees. Then the mmf in the air gap of SPIM 104 is a traveling wave that is a constant amplitude and rotates at a constant speed. The resultant air gap flux produced by the mmf also has a constant amplitude and rotates at a constant speed. Consequently, the electromagnetic torque generated by the SPIM 104 is constant and has a value that is a direct function of the air gap mmf amplitude.

Assume now that we change only the frequency of the control winding voltage Vc, affecting only its respective current and let all other conditions remain the same. The result is four traveling mmf waves, and consequently four traveling flux waves, rotating forward and backward at two different speeds (function of the differences in frequencies). Hence, the amplitude and speed of the resulting mmf are not constant any longer. The resulting air gap rotating flux wave amplitude pulsates and reserves direction as a function of the difference in speeds. Therefore, the torque produced by the SPIM 104 pulsates assuming positive and negative values, thus reversing the motor rotation.

Figure 11:
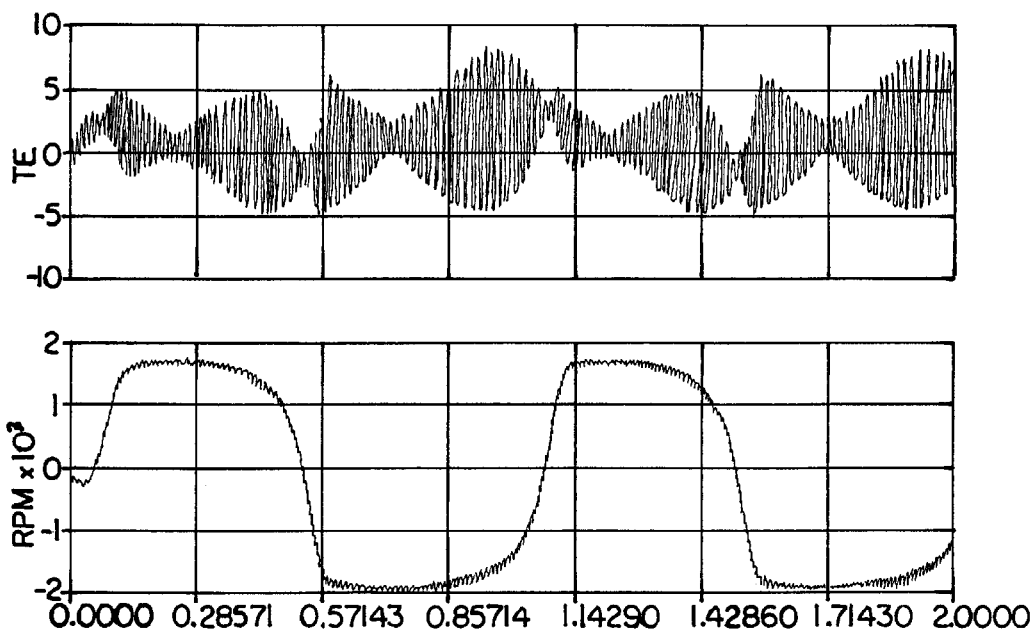
FIG. 11 illustrates the torque versus time and the speed versus time of a SPIM reversing direction when the two windings of the SPIM are operated at different frequencies.

With the control winding W1 operating at a different frequency than the line winding W2 (ac supply line frequency), the SPIM 104 exhibits a pulsating average torque generated at a frequency of twice the difference between the line winding frequency and the control winding frequency. FIG. 11 shows the SPIM 104 reversing action generated by operating the windings at different frequencies. The motor torque TE in Nm and motor speed in rpm are respectively plotted in the upper and bottom traces versus time in seconds.

Braking Mode

Another important feature of the SPIM controller 100 is the function of slowing or stopping a SPIM. SPIM controller 100 has a braking function that is useful by reducing or eliminating the requirements and cost of mechanical (friction, centrifugal force, etc.) braking systems. The SPIM controller 100 braking reduces the stopping time of the SPIM. The reduced stopping time shortens the cycle time in SPIM driven machines where the machine cycle has a large number of motor stops, such as in an automatic clothes washer. The SPIM controller 100 braking function is a special application of two of the controller functions described earlier, alone or in combination.

SPIM 104 braking is accomplished with the system of FIG. 2 operated in a manner similar to Phase Angle Reversing Mode, which reverses the direction of the SPIM as shown in FIG. 9. The control winding voltage Vc of the SPIM controller 100 supplying the control winding W1 is changed from a +90 degrees phase angle difference relative to ac line to a −90 degree phase angle difference or vice versa. The change in the phase angle generates a torque that is opposite in direction than the current direction of rotation of the motor. The opposing torque effectively brakes the motor by slowing its rotation. However, unlike the phase angle reversal previously described, it is necessary to stop the generation of the opposing torque as the motor rotational speed approaches zero or the motor will reverse and not stop. There are many well known methods to determining when to stop the generation of the braking torque. One can simply monitor the rotational speed of the motor with the microcomputer, for example. In the invention, it is preferred that the braking torque be applied for a predetermined time. The predetermined time is relatively short because the braking torque generated by changing the phase angle from −90 degrees to +90 degrees is of a large enough magnitude to almost instantaneously stop the motor.

A disadvantage of the large magnitude braking force is that it can damage the load connected to the motor. Therefore, in some applications, it is desirable to soften the rate of braking, which can be achieved by changing the phase angle from a given angle that is leading or lagging ac line voltage to an angle of lesser magnitude and respectively lagging or leading the ac line voltage, but is preferably achieved reducing the fundamental component amplitude of the control winding voltage VL at the same time the phase angle change is made to reduce the magnitude of the opposing torque so that the motor is stopped at a slower rate and is not immediately started in the opposite direction. The reduction of the fundamental component amplitude of the voltage is preferably accomplished by means of pulse width modulation.

SPIM 104 braking is also accomplished by reducing the frequency of the control winding voltage Vc applied the control winding W1 by the SPIM controller 100. In the extreme case as the frequency of the control winding voltage Vc becomes zero, a dc voltage is applied to the control winding W1 that will generate a negative torque that will brake the SPIM 104. In both SPIM 104 braking modes mentioned above, the rotational energy stored in the momentum of the system is dissipated in the motor rotor circuit as heat. For instance, this breaking action may not be enough to stop a load with a large inertia alone; however, it can assist a mechanical brake with such a load.

High Torque/Low Speed Mode

In some applications, it is desirable for the SPIM 104 to generate a high torque at low speed. This mode provides a simple means to accomplish a high torque at low speed. For this mode, it is necessary for the SPIM controller 100 to include the switch S3, which connects the line winding W2 to the ac line. The requirement of switch S3 enables the control 100 to connect and disconnect the ac line and the line winding W2 such that the line winding W2 sees a synthesized ac waveform at a frequency that is lower than the ac line frequency. In the High Torque/Low Speed Mode, the operation of the SPIM controller 100 is substantially identical to the operation as previously described, except for the control of the switch S3. Therefore, these operations will not be described in detail.

The switch S3, which is shown as, but not limited to, a triac is used to alter the ac line waveform characteristics supplied to the line winding W2. The switch S3 is part of the power switching circuit 102 that is controlled by control circuit 106. The gate gT of switch S3 is driven by one of the gate drivers 114 as is shown in the control circuit 106. The gate drivers 114 are driven by microcomputer 112. Microcomputer 112 executes software stored in its memory and generates the proper output pattern for gates g1, g2, and gT by selecting via a pointer, a proper look up table and location stored in the memory of microcomputer 112. The microcomputer 112 has a different set of look-up tables that are used to operate SPIM 104 in this mode. Gates g1, g2, and gT, respectively, drive power transistors S1, S2, and power semiconductor switch S3 that in turn drive the SPIM 104 according to the description below.

Figure 12:
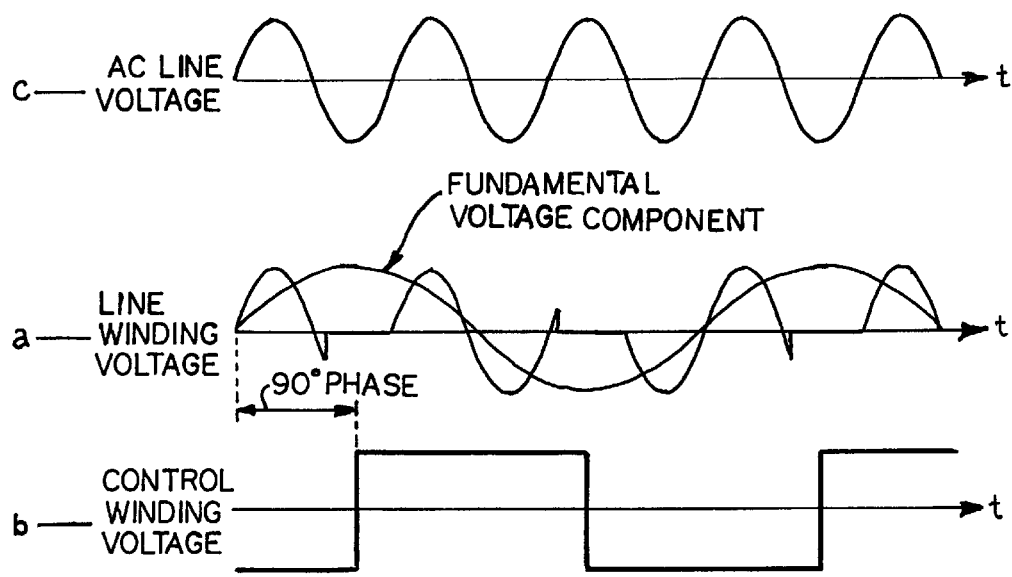
FIG. 12 illustrates the relationship of the voltages of the line winding and the control winding when the SPIM is operated in a high torque and low speed mode with the first embodiment of the invention shown in FIG. 2.

The microcomputer 112 uses the switch S3 to select the number and polarity of ac line voltage cycles applied to the line winding W2. FIG. 12a, shows a specific example of how the embodiment closes and opens switch S3 such that a fundamental voltage component with a frequency of ⅓ the ac line frequency is applied to the line winding W2. FIG. 12b, also shows the SPIM controller 100 control winding voltage Vc applied to the control winding W1 such that the fundamental component of controller control winding voltage Vc has a 90 degree phase shift with respect to the line winding voltage. The ac line voltage is shown in FIG. 12c.

The SPIM 104 operated according to this mode produces a high torque at the lower synthesized line frequency (⅓ ac line). This lower frequency is accomplished by the proper control of the switch S3 that is in series with line winding W2. The controller 100 supplies to the control winding W1 with a PWM voltage waveform that is 90 electrical degrees out of phase with the fundamental component of the synthesized low frequency waveform applied to the line winding W2. Keeping these two waveforms 90 degrees out of phase optimizes the torque.

The high torque low speed operation of the SPIM 104 can provide special low speed machine operations without having to change the amplitude, phase angle, or frequency of the control winding voltage Vc, although, it is an option to change these factors and further modify the SPIM's performance.

Split Phase Mode

Thus far, the SPIM controller 100 of the invention has been described controlling a SPIM 104 via the control winding voltage Vc supplied to the SPIM's control winding W1, with the SPIM's line winding W2 being connected directly to the ac supply line, with or without a switch S3. The SPIM controller 100 can also control the SPIM 104 so that it operates like a split phase motor by using only one winding during running; but using both windings as previously described to start the SPIM 104 and bring it up to a predetermined speed at or below synchronous at which the switch S3 opens to remove the ac supply from the line winding W2, whereby the SPIM 104 continues to operate as a split phase motor. The SPIM controller 100 then controls the speed of the SPIM 104 by controlling the frequency or frequency and amplitude of the control winding voltage Vc applied to the control winding W1 by sending the appropriate waveform switching pattern to the power switching circuit. Preferably, the SPIM 104 is driven effectively at greater than, equal to, and lower than the synchronous speed using an unmodulated square wave waveform whose fundamental frequencies are greater than, equal to, and lower than, respectively, the synchronous frequency of the motor. Using an unmodulated square wave to drive the SPIM 104, especially at higher than synchronous speed, has many advantages over a sinusoidal or shaped waveform. One of the most important advantages is that there is more voltage available in the fundamental component of an unmodulated square wave than other waveforms, which results in a higher motor breakdown torque, especially when operating at higher than synchronous speeds. The use of an unmodulated square wave guarantees the maximum possible voltage, which yields maximum torque for a given phase angle. Previously, unmodulated square waves have not been used to drive SPIMs because of the negative effects of acoustic noise, heat, and vibration To use a square wave at lower than synchronous speed in previous motors, pulse width modulation would have been used to shape the square wave more like a sinusoidal waveform at all operation speeds in order to counter or avoid negative effects that otherwise might arise in the motor operation, such as acoustic noise and vibration. Unfortunately, the use of PWM reduces the maximum amplitude of the fundamental component of the waveform, resulting in lower voltage and consequently lower breakdown torque, which is especially disadvantageous at higher than synchronous speeds. Contrary to the result of using a square wave at lower than synchronous speeds, it has been found that SPIMs provide sufficient inherent filtering so as to tolerate driving by unmodulated square wave signals at frequencies higher than synchronous, eliminating the need for PWM control when operated above synchronous speed.

Figure 13:
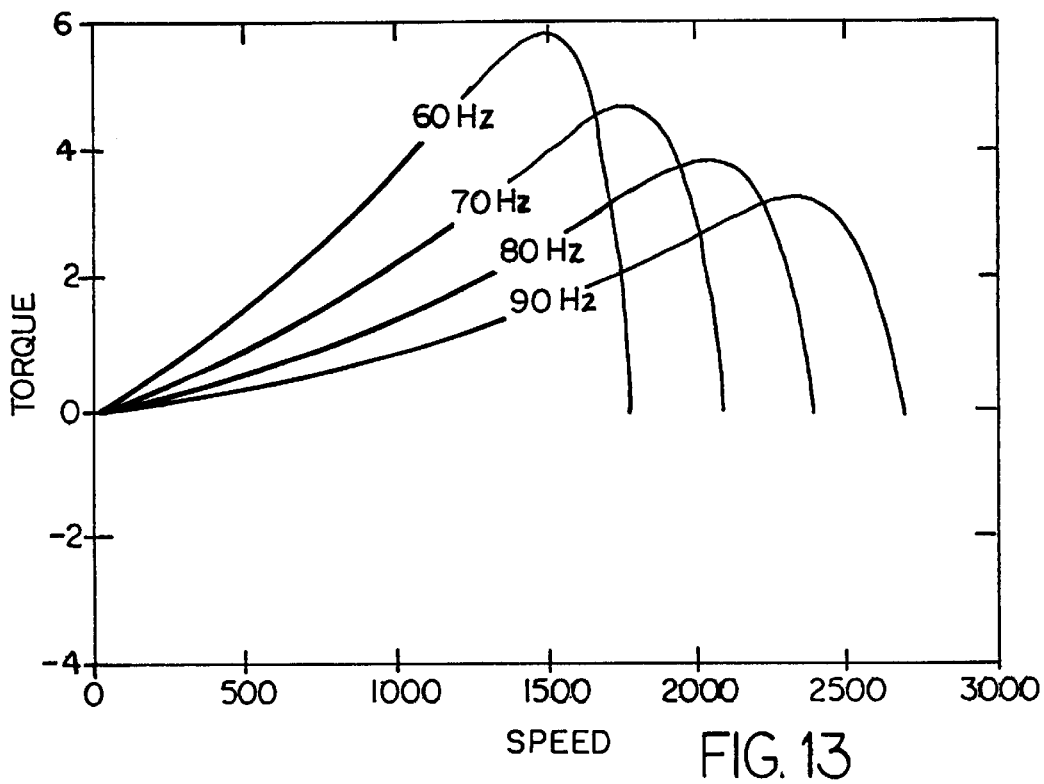
FIG. 13 illustrates the torque versus speed curves for a SPIM using the first embodiment shown in FIG. 2 and operating in a split phase mode as a function of supply frequencies of 60 Hz and greater with a constant motor input fundamental voltage amplitude.

In FIG. 13 there are illustrated torque versus speed curves for a SPIM 104 operating split phase, i.e., without a running capacitor, for supply frequencies ranging from rated 60 Hz up to 90 Hz. The motor voltage amplitude was kept constant at its rated value (which is defined at 60 Hz), as the frequency was increased. As can be seen, for a given torque, the motor speed is a function of the supply frequency. As can also be seen, slip increases as the supply frequency increases for a constant load torque.

Figure 14:
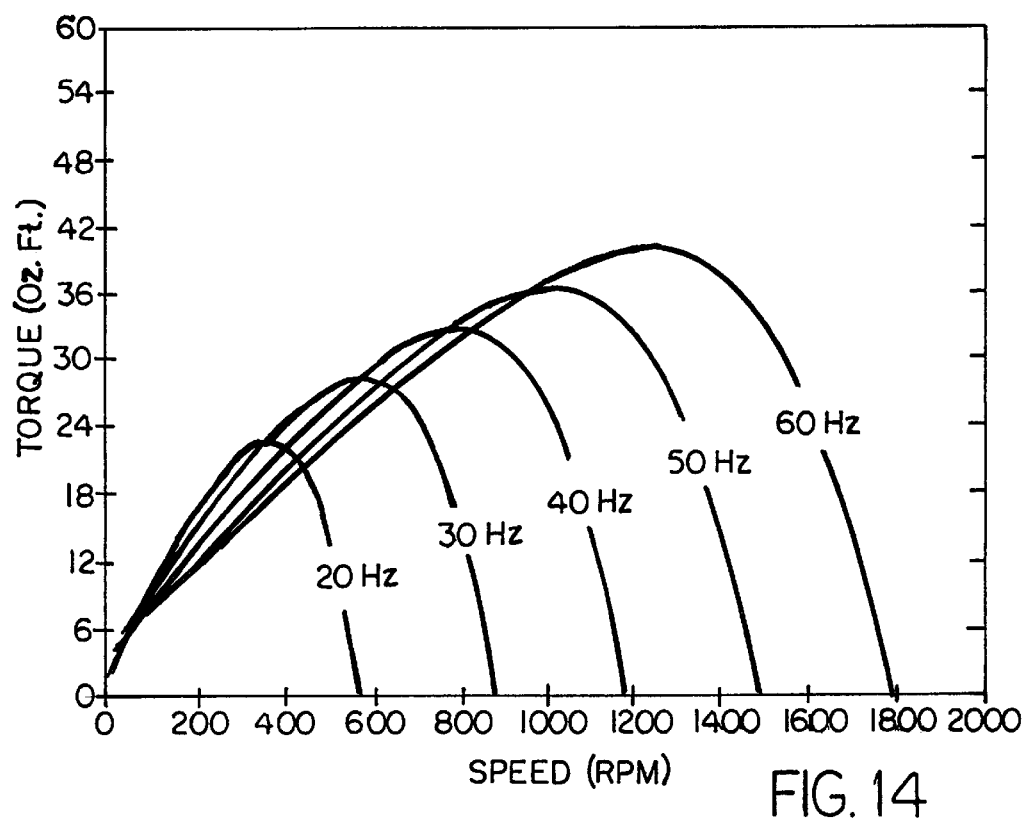
FIG. 14 illustrates torque versus speed curves for a SPIM using the first embodiment shown in FIG. 2 and operating in a split phase mode as a function of supply frequencies of 60 Hz and lower, the ratio of motor voltage input fundamental amplitude per input frequency in hertz was kept constant.

Referring now to FIG. 14, illustrates torque versus speed curves for a SPIM 104 running split phase for supply frequencies at and below synchronous speed and ranging from the synchronous frequency of 60 Hz down to 20 Hz. The applied voltage amplitude was reduced proportionally with frequency so that the ratio of volts per hertz was kept constant to avoid magnetic saturation, in order to avoid excessive motor losses and performance degradation. The reduction in voltage with reduction in supply frequency serves to retain a constant magnetic flux.

Referring back to FIG. 13, it can be seen that the maximum available torque, or the breakdown torque, reduces as the frequency is increased and the supply voltage is held constant. It is a challenge therefore to provide adequate torque as the supply frequency is increased.

Figure 15:
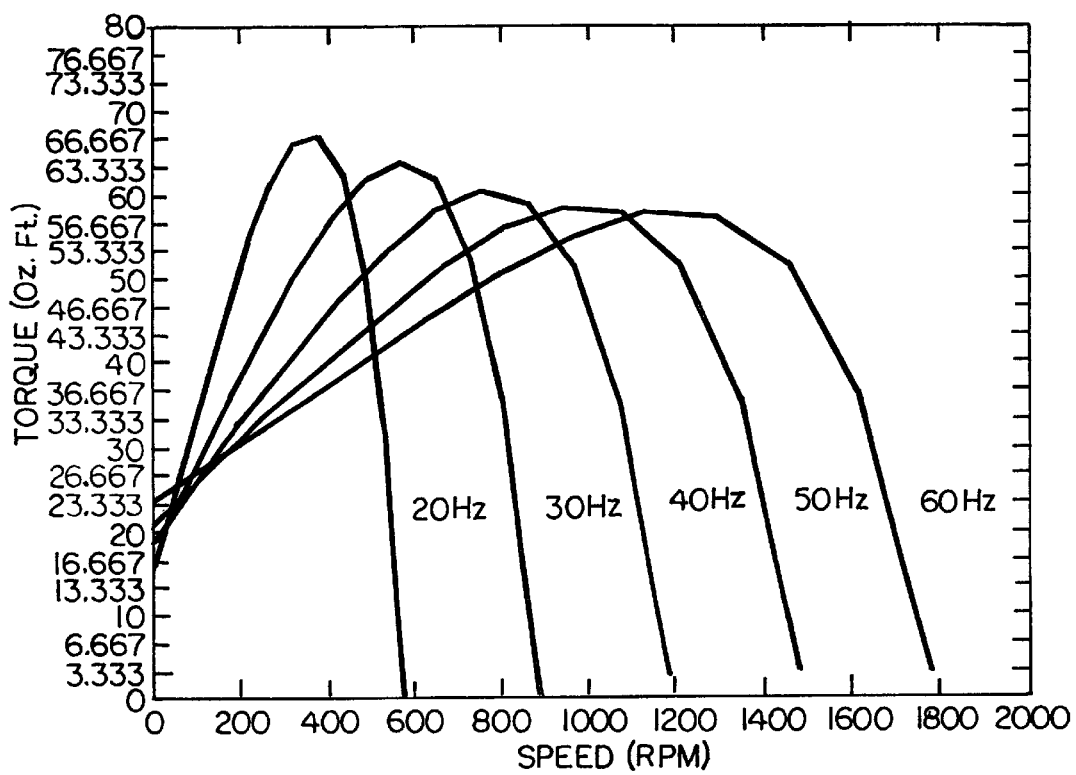
FIG. 15 illustrates torque versus speed curves for a SPIM using the first embodiment shown in FIG. 2 and operating in a split phase mode at supply frequencies of 60 Hz and lower under a non-constant V/F ratio (control voltage/control frequency).

FIG. 15 illustrates torque versus speed curves for a SPIM operating at the synchronous frequency (60 Hz) and below under a nonconstant supply voltage, per the invention. In this case, the voltage is a function of the frequency as: Vs=0.67f+80, with voltage measured in Vrms and frequency measured in Hz. In general, a function of the type: V=K1f+K2 has to be used in order to compensate when operating the SPIM at lower than synchronous speed. The constants K1 and K2 are values that depend on the motor design and performance requirements. For example, they may be adjusted (selected) in order to keep constant breakdown torque as a function of speed as shown in FIG. 15; however, losses will also become larger. Other criteria for adjusting (selecting) these constants may be a desire to keep a constant magnetization current or constant losses as a function of the applied frequency. Computer modeling and simulation can be used to derive these constants since a closed model may be difficult to analyze for a SPIM 104. In practice, these constants would be stored in a computer memory and the voltage equation just described would then be implemented as a function of the frequency.

Figure 16:
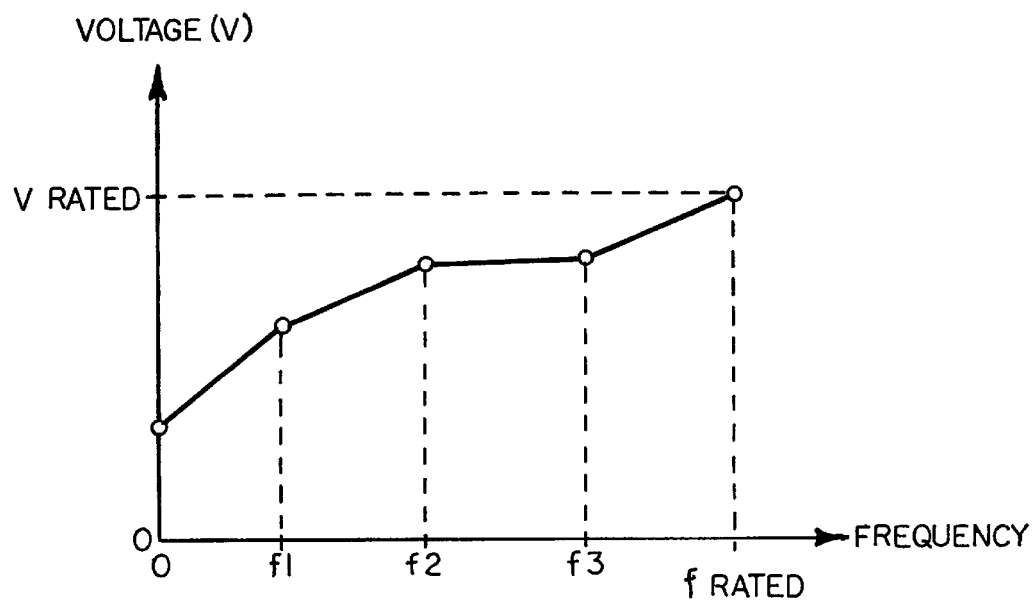
FIG. 16 illustrates an example of a piecewise linear voltage to frequency relationship for a piecewise constant V/F control used to compensate for variations in the SPIM and load characteristics.

It is a further improvement of the invention that the applied motor voltage is described by a piecewise linear function, where the supply voltage of each frequency domain may have a different V/F ratio (FIG. 16). Each linear segment is defined by two constants, and represented by: volts=k1 *frequency+k2 for a frequency value between 0 and f1, for instance. This preferred operation provides a greater degree of control of the SPIM The control of a voltage applied to a motor as a function of frequency normally is implemented using one of several known sinusoidal pulse width modulation techniques. However, in accordance with principles of the invention, for operation at lower than synchronous speed, a harmonic suppression technique with a square wave can be used instead of a PWM sinusoidal technique. This harmonic suppression technique allows for a simple voltage control without excessive overhead for the control electronics or microcomputer software and hardware. Such a motor control is described in greater detail in U.S. patent application Ser. No. 60/019,749, which is incorporated herein by reference. This application discloses a motor controller that drives a SPIM 104 at above or below rated frequencies with a square wave. The square wave is shaped by introducing one or more notches to eliminate or suppress undesirable harmonics, to reduce the amplitude of the fundamental, to provide desirable voltage control, or to provide desirable voltage to frequency control.

The harmonic suppression technique mentioned above takes into consideration, the fact well known in the art, that a given time based waveform can be controlled (i.e., reduced, or even eliminated) by introducing appropriate notches in the waveform. As described herein, a square wave (whether pure or notched) which is to be applied to a motor is always generated by the SPIM controller 100. The motor current is a function of the motor impedance and internal voltages.

The referenced suppression but not elimination of the fundamental frequency component comes into play particularly in schemes wherein voltage to frequency ratios are controlled at lower than rated frequency operation.

Figure 17:
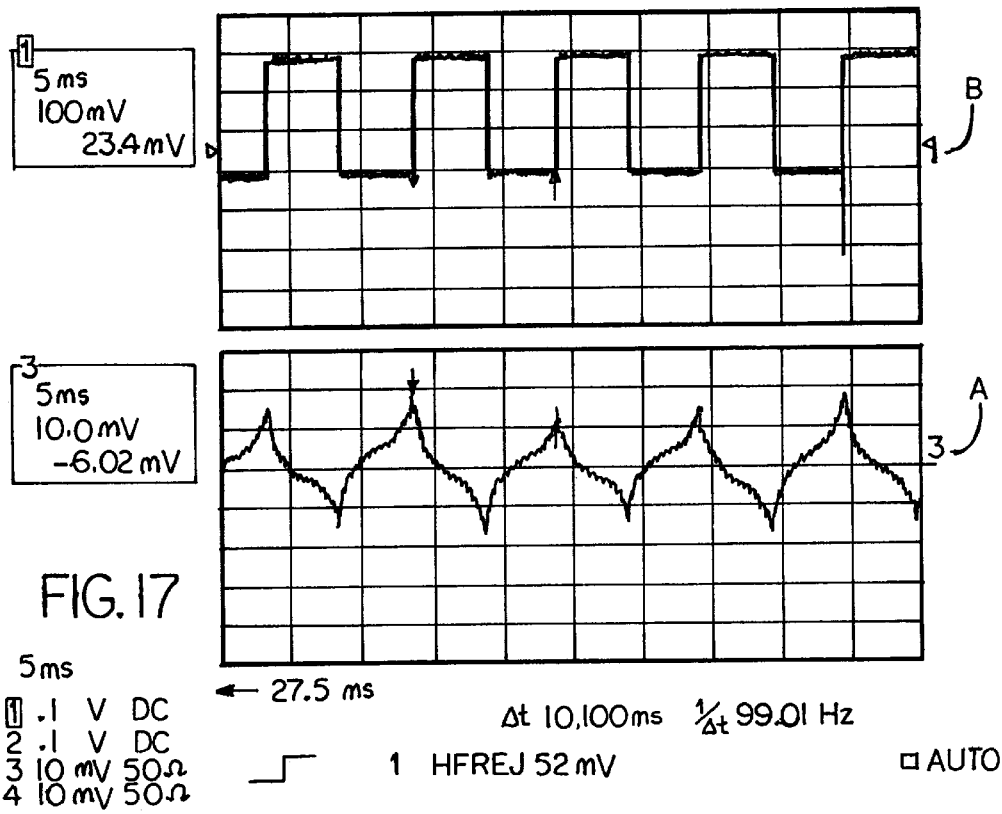
FIG. 17 illustrates a plot of a SPIM phase current for a SPIM using the first embodiment shown in FIG. 2 and operating in a split phase mode during steady state operation at about 3,000 rpm.
Figure 18:
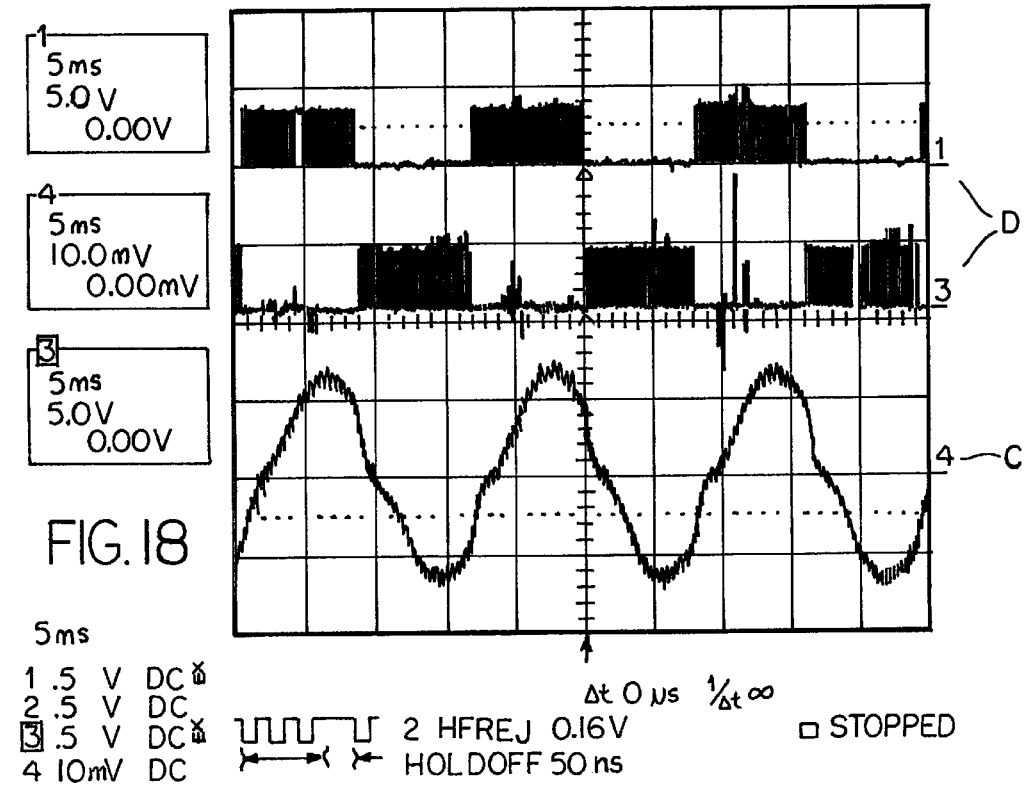
FIG. 18 illustrates a plot of a SPIM phase current for a SPIM using the first embodiment shown in FIG. 2 and operating in a split phase mode during steady state operation at about 1,800 rpm.

FIGS. 17–18 illustrate experimental results obtained from implementation of the invention The current of the control winding W1 current of the SPIM 104 during steady state operation is illustrated in FIG. 17 as curve or trace A The SPIM is a 4 pole SPIM operating in the split phase mode, that is unloaded and running at approximately 3,000 rpm. The gate signal applied to one of the power transistors of the SPIM controller is illustrated as curve or trace B.

In FIG. 18 there is illustrated a curve or trace C for the control winding W1 current during steady state operation of the SPIM 104, in the split phase mode, at the speed of 1,800 rpm Also illustrated is a curve or trace D for the gate signals applied to the power transistors by the control circuit 106 of the SPIM controller 100.

Second Embodiment

Figure 19:
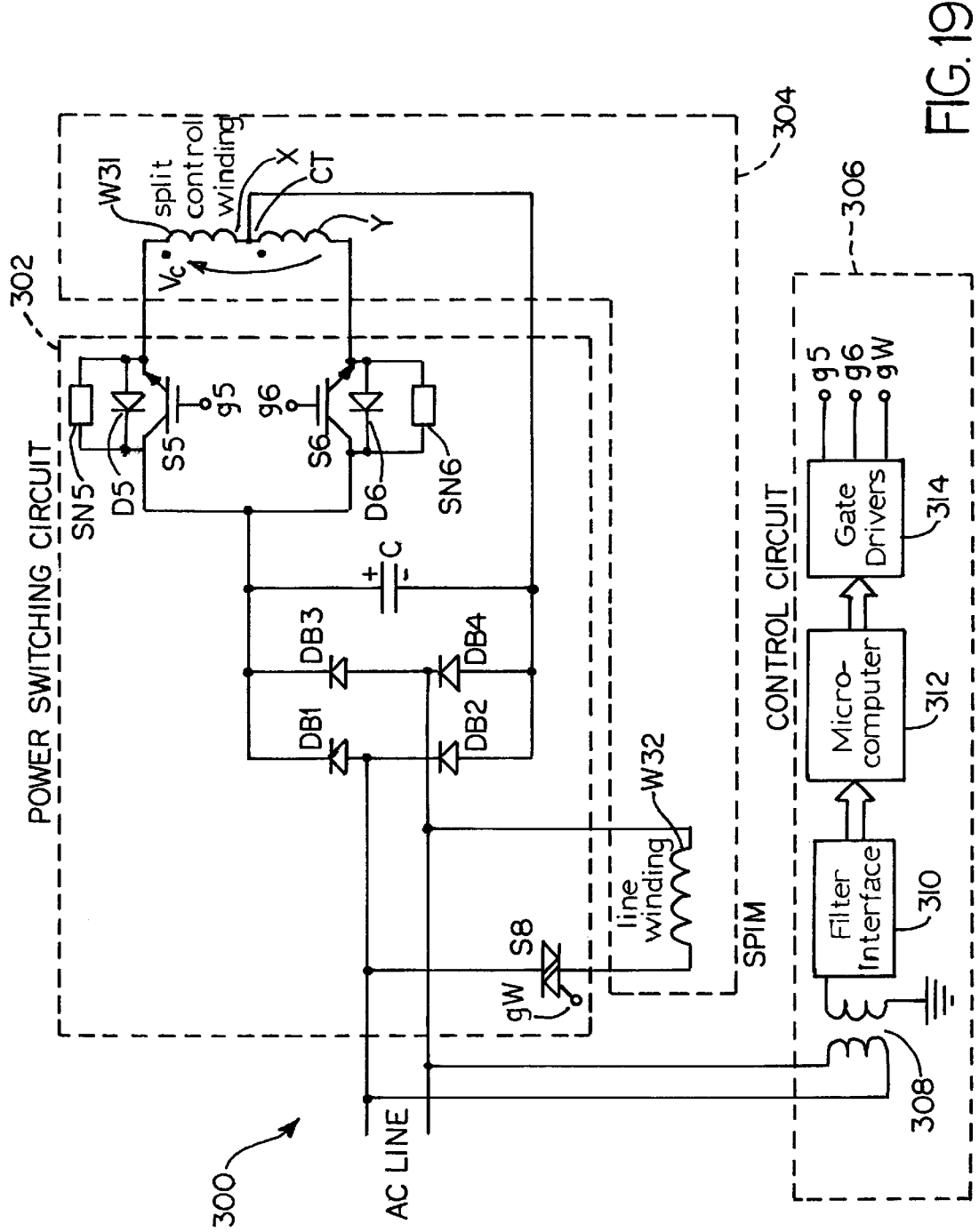
FIG. 19 illustrates a second embodiment of a SPIM controller according to the invention that reduces circuit component requirements.

FIG. 19 illustrates a second embodiment of the invention that reduces the component requirements to reduce circuit cost. A SPIM controller 300 comprises a power switching circuit 302, a SPIM 304 and a control circuit 306, which function together to obtain an ideal voltage phase shift of 90 degrees (in time) throughout the entire operational range of the SPIM 304 by controlling the applied voltage.

The SPIM controller 300 utilizes the SPIM 304 comprising a split control winding W31 and a line winding W32. The split control winding comprises winding X and winding Y that are balanced and have the same winding distribution and number of turns. Each winding is one half of the control winding W31, and winding X and winding Y have a center tap CT between them. The control winding W31 is connected to and supplied by the power switching circuit 302. The power switching circuit 302 has a direct connection to the ac line and supplies a control winding voltage Vc to the control winding W31 of the SPIM 304. The power switching circuit 302 is connected to and controlled by a control circuit 306. The second embodiment is operated in a manner similar to the first embodiment. Moreover, the second embodiment can be operated in all the same modes as described above for the first embodiment.

The power switching circuit 302 operates as an interface between the low voltage control circuit 306 and the high voltage operation of the SPIM 304. The input stage of the power switching circuit 302 comprises diodes DB1, DB2, DB3, and DB4 in the form of a dc bridge and capacitor C. The input stage receives power directly from the ac line, stores it as a DC voltage, and makes it available to an output stage that comprises power transistors S5 and S6 and diodes D5 and D6 and snubber circuits SN5 and SN6 (S5 and S6 are shown as insulated gate bipolar transistors). The transistor arrangement enables the power switching circuit 302 to supply winding X and winding Y of the center tapped CT split control winding W31 of the SPIM 304 with a voltage up to the amplitude of the ac supply voltage. A SPIM 304 rated for 120 V or 230 V AC can then be used with SPIM controller 300. The power transistors S5 and S6 are turned on and off by the low voltage control circuit 306 in a manner similar to that described in the first embodiment shown in FIG. 2. The diodes D5 and D6 provide a path for inductive currents to flow when motor magnetic fields collapse as the power transistors S5 and S6 are switched off The snubber circuits SN5 and SN6 are conventional snubber circuits of the RC type (resistor and capacitor) or RCD type (resistor, capacitor, and diode). Snubber circuits SN5 and SN6 reduce the induced voltage across power transistors S5 and S6 as power transistors S5 and S6 are switched off and also help dissipate the energy stored in SPIM 304 and in the circuit leakage inductance. The control circuit 306, comprising transformer 308, filter interface 310, microcomputer 312, and gate drivers 314, operates in a manner similar to control circuit 106 of the first embodiment shown in FIG. 2 with gate drivers 314 providing the proper gating waveforms to the gates g5, g6 and gW of the respective power transistors S5 and S6, and switch S3. The microcomputer 312 has a different set of look-up tables that are used to operate with the split control winding W31 of SPIM 304.

The additional utility embodied in SPIM controller 300 lies mainly in the manner of the DC operation of the power switching circuit 302. Compared to the other embodiments, the input diodes DB1, DB2, DB3, and DB4 each have a smaller forward current requirement and one half the peak inverse voltage requirement and the required capacitance of C is approximately one half.

It will be obvious to one skilled in the art that the operations described for the first embodiment can be implemented with the circuitry of the second embodiment. This includes but is not limited to SPIM controller 300 controlling SPIM 304 to provide a variable torque and speed, a change in the direction of rotation implemented with varying torque and speed, a high torque low speed mode of operation, and a split phase mode of operation.

In general, the present invention provides means and method for controlling the speed and direction of a single phase induction motor.

The invention provides a means to control the voltage to one of the windings of a SPIM while the ac line voltage is applied to the second winding. The invention optimizes the torque per ampere at speeds at or below synchronous speed (set by ac line frequency). The 90 degree phase shift that gives the optimum torque per ampere can be provided for all load points at these speeds. Maximum torque is provided when the optimized controlled voltage to the control winding is an unmodulated square wave.

The invention also provides a means to control the starting and running torque and the rate of reversing direction of the SPIM through adjusting the control winding voltage Vc of the controller. The adjustment of the control winding voltage Vc is accomplished by controlling the fundamental voltage component through pulse width modulation or harmonic suppression methods and also by changing the phase angle of the voltage to the control winding relative to the line winding, or both. The invention can also selectively apply power to the line winding of the SPIM in conjunction with the above methods of controlling the voltage to the control winding. This combination provides a high torque with reversals at low speeds. In so controlling the magnitude and direction of the torque, the invention controls the speed and direction of the SPIM.

The invention can also control the torque and direction of the SPIM by adjusting the frequency of the controller voltage to the control winding relative to the ac line voltage of the line winding.

Also, after staring, the invention can disconnect the line winding of the SPIM and control the speed of the SPIM through controlling the voltage to the control winding. In this manner the SPIM speed is controlled by the amplitude and frequency of the controller voltage.

Although modifications and changes may be suggested by those skilled in the art, it is the intention of the inventors to embody within the patent warranted hereon all changes and modifications as reasonably and properly come within the scope of their contribution to the art. Further, the invention is applicable to all products where optimum, variable speed, and/or reversing would be used, either to save energy, improve operation performance, or to add differentiating features.

We claim:

1. A method for reversing an induction motor adapted to be supplied by an alternating current supply (ac supply), the motor comprising a line winding directly connected to the ac supply for supplying an ac voltage waveform to the line winding, a control winding, and a controller connected between the ac supply and the control winding for applying a control voltage waveform to the control winding to control the operation of the control winding, the method comprising:

applying the control voltage waveform to the control winding to effect a reversal of the motor;

monitoring the ac voltage waveform and applying a predetermined control voltage waveform to the control winding in response to the monitored ac voltage waveform to effect the reversal; and selecting a predetermined waveform switching pattern from the memory of a microprocessor of the controller and applying the waveform switching pattern to a power switching circuit of the controller to generate the control voltage waveform applied to the control winding.

2. The method of claim 1, wherein the application of an electrical voltage step includes maintaining a predetermined phase angle between the ac voltage waveform and the control voltage waveform to effect reversal.

3. The method of claim 2, wherein the predetermined phase angle is maintained at approximately 90 degrees leading (lagging) the ac voltage waveform, then the predetermined phase angle is maintained at approximately 90 degrees lagging (leading) the ac waveform to obtain the maximum reversal to effect a maximum rate of reversal.

4. The method of claim 1, wherein the ac voltage waveform monitoring step includes the monitoring of the ac voltage zero crossings by the controller to determine the polarity of the ac voltage waveform.

5. The method of claim 1, wherein the predetermined phase angle is maintained at a leading angle or maintained at a lagging angle relative to the ac voltage waveform.

6. The method of claim 1, wherein the application of the control voltage waveform step includes creating a phase angle between the control voltage waveform and the ac voltage waveform and increasing the phase angle to effect a soft reversal of the motor.

7. The method of claim 6, and further including the step of increasing the phase angle to approximately 90 degrees and inverting the polarity of the control voltage waveform to obtain the maximum rate of reversal.

8. The method of claim 1, and further including the step of creating a phase angle between the control voltage waveform and the ac voltage waveform of approximately 90 degrees and inverting the polarity of the control voltage waveform to effect a maximum rate of reversal.

9. The method of claim 1, wherein the step of applying the control voltage waveform step includes controlling the frequency of the control voltage waveform so that it is different than the frequency of the ac voltage waveform to effect a reversal of the motor.

10. The method of claim 9, wherein the control voltage waveform frequency is not more than sixty Hertz different than the ac voltage waveform frequency.

11. The method of claim 9, wherein the control voltage waveform frequency is approximately one Hertz different than the ac voltage waveform.

12. A method for controlling an induction motor adapted to be supplied by an alternating current supply (ac supply), the motor comprising a line winding directly connected to the ac supply for supplying an ac voltage waveform to the line winding, a control winding, a controller connected between the ac supply and the control winding for applying a control voltage waveform to the control winding to control the operation of the control winding, and a switch provided in the direct connection between the ac supply and the line winding and being controlled by the controller, the method comprising:

selecting the number and polarity of ac line voltage waveform cycles applied to the line winding by controlling the actuation of the switch to alter the fundamental component of the ac voltage waveform applied to the line winding thereby effectively reducing the operating speed of the motor while maintaining the motor torque output.

13. The method of claim 12, and further comprising the step of optimizing the motor torque/ampere ratio throughout the operational range of the motor.

14. The method of claim 12, and further including the step of maintaining a predetermined phase angle between the ac voltage waveform and the control voltage waveform to maximize the torque.

15. The method of claim 14, wherein the maintaining the predetermined phase angle step comprises the step of maintaining the phase angle of the control voltage waveform at approximately 90 degrees relative to the ac voltage waveform.

16. The method of claim 14, and further including the step of shaping a predetermined control voltage waveform to be an unmodulated square wave to further maximize the torque.

17. The method of claim 14, and further including the step of maximizing the amplitude of the control voltage waveform to further maximize the torque.

18. The method of claim 12, and further comprising applying a control voltage waveform to the control winding to effect a reversal of the motor.

19. The method of claim 18, wherein the application of an electrical voltage step includes maintaining a predetermined phase angle between the ac voltage waveform and the control voltage waveform to effect reversal.

20. The method of claim 12, and further comprising the step of controlling the frequency of the control voltage waveform so that it is different than the frequency of the ac voltage waveform to effect a reversal of the motor.

21. The method of claim 20, wherein the control voltage waveform frequency is approximately one Hertz different than the ac voltage waveform.

22. A controller for an induction motor adapted to be supplied by an alternating current supply (ac supply), the motor comprising a line winding directly connected to the ac supply for supplying an ac voltage waveform to the line winding and a control winding connected to the ac supply, the controller comprising:

a power switching circuit connected to the control winding of the motor and adapted to be connected to the ac supply, the power switching circuit applies a control voltage waveform to the control winding such that the motor torque per ampere ratio is optimized;

a control circuit connected to the power switching circuit and adapted to be connected to the ac supply, the control circuit applies a switching pattern to the power switching circuit to control the control voltage waveform applied by the power switching circuit so that the control voltage waveform is at a different frequency than the frequency of the ac voltage waveform to reverse direction of the motor.

23. The controller according to claim 22, wherein the difference between the frequency of the control voltage waveform and the ac voltage waveform is less than 60 Hz.

24. A controller for an induction motor adapted to be supplied by an alternating current supply (ac supply), the motor comprising a line winding directly connected to the ac supply for supplying an ac voltage waveform to the line winding and a control winding connected to the ac supply, the controller comprising:

a power switching circuit connected to the control winding of the motor and adapted to be connected to the ac supply, the power switching circuit applies a control voltage waveform to the control winding such that the motor torque per ampere ratio is optimized;

a control circuit connected to the power switching circuit and adapted to be connected to the ac supply, the control circuit applies a switching pattern to the power switching circuit to control the control voltage waveform applied by the power switching circuit; and a switch positioned within the direct connection of the line winding and the ac supply and controlled by the control circuit to open or close the switch wherein the controller controls the switch to apply a selected number and polarity of alternating current line cycles of the ac voltage waveform to the line winding from the ac supply to effectively reduce the frequency of the ac voltage waveform applied to the line winding and reduce the speed of the motor without a corresponding reduction in motor torque.

25. The controller according to claim 24, wherein the control circuit opens the switch to operate the motor as a split phase motor running only the control winding.

26. A controller for an induction motor adapted to be supplied by an alternating current supply (ac supply), the motor comprising a line winding directly connected to the ac supply for supplying an ac voltage waveform to the line winding and a control winding connected to the ac supply, the controller comprising:

a power switching circuit connected to the control winding of the motor and adapted to be connected to the ac supply, the power switching circuit applies a control voltage waveform to the control winding such that the motor torque per ampere ratio is optimized;

a control circuit connected to the power switching circuit and adapted to be connected to the ac supply, the control circuit applies a switching pattern to the power switching circuit to control the control voltage waveform applied by the power switching circuit; and the control winding is a center tapped winding defining a first and a second sub-winding, the control circuit comprises an input stage connected to the ac supply and having a dc bridge connected in parallel to a capacitor and connected to the tap of the control winding, and an output stage connected to the input stage and having a pair of power transistors connected with one power transistor connected to a non-tapped side of the first sub-winding and the other power transistor connected to a non-tapped side of the second sub-winding.

* * * * *